Nov. 13, 1951     C. M. LEE ET AL     2,575,020
FOCUS ADJUSTING MECHANISM FOR AERIAL CAMERAS
Filed Dec. 6, 1947     3 Sheets-Sheet 1
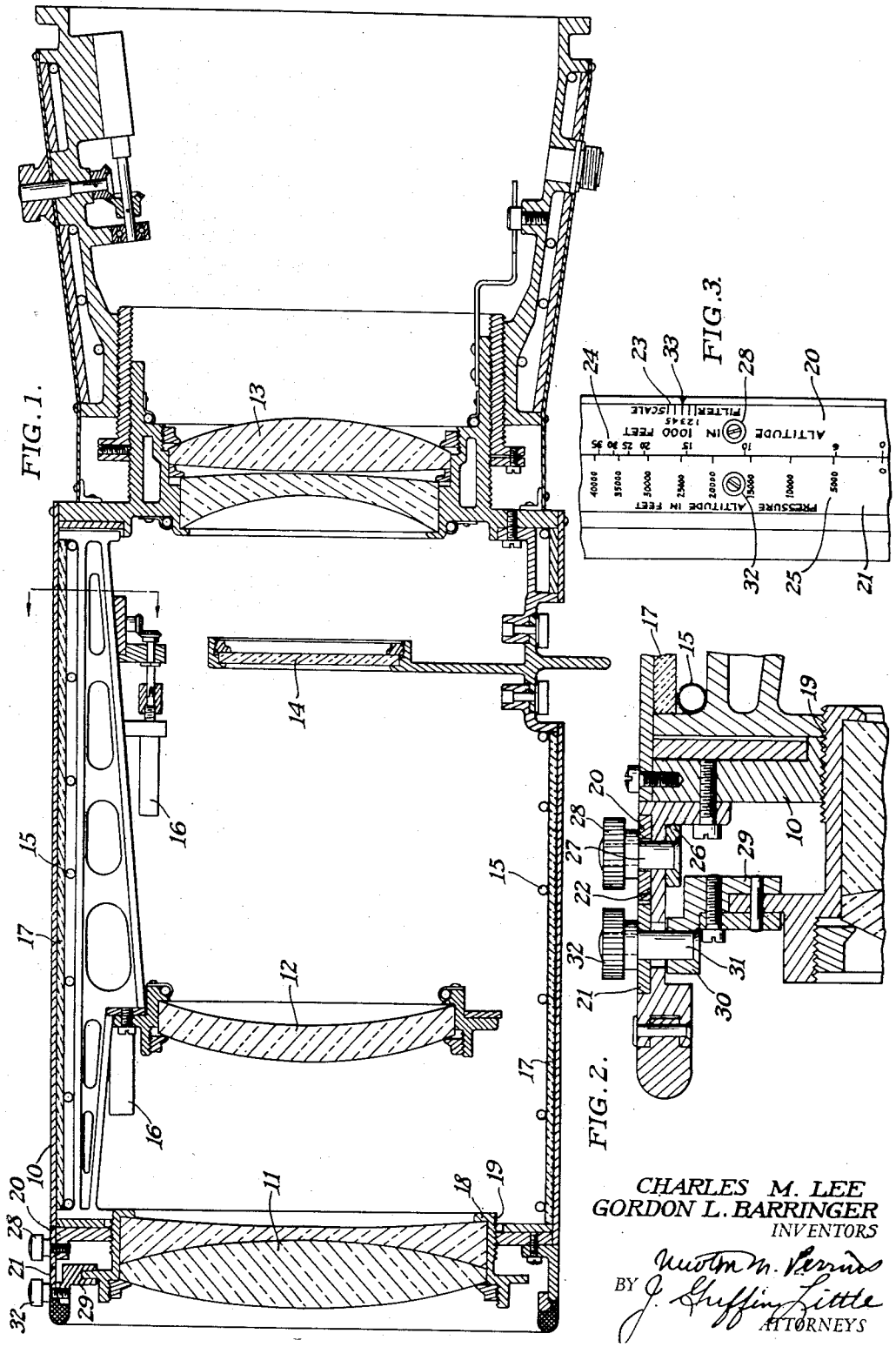
CHARLES M. LEE
GORDON L. BARRINGER
INVENTORS Nov. 13, 1951
C. M. LEE ET AL
2,575,020
FOCUS ADJUSTING MECHANISM FOR AERIAL CAMERAS
Filed Dec. 6, 1947
3 Sheets-Sheet 2
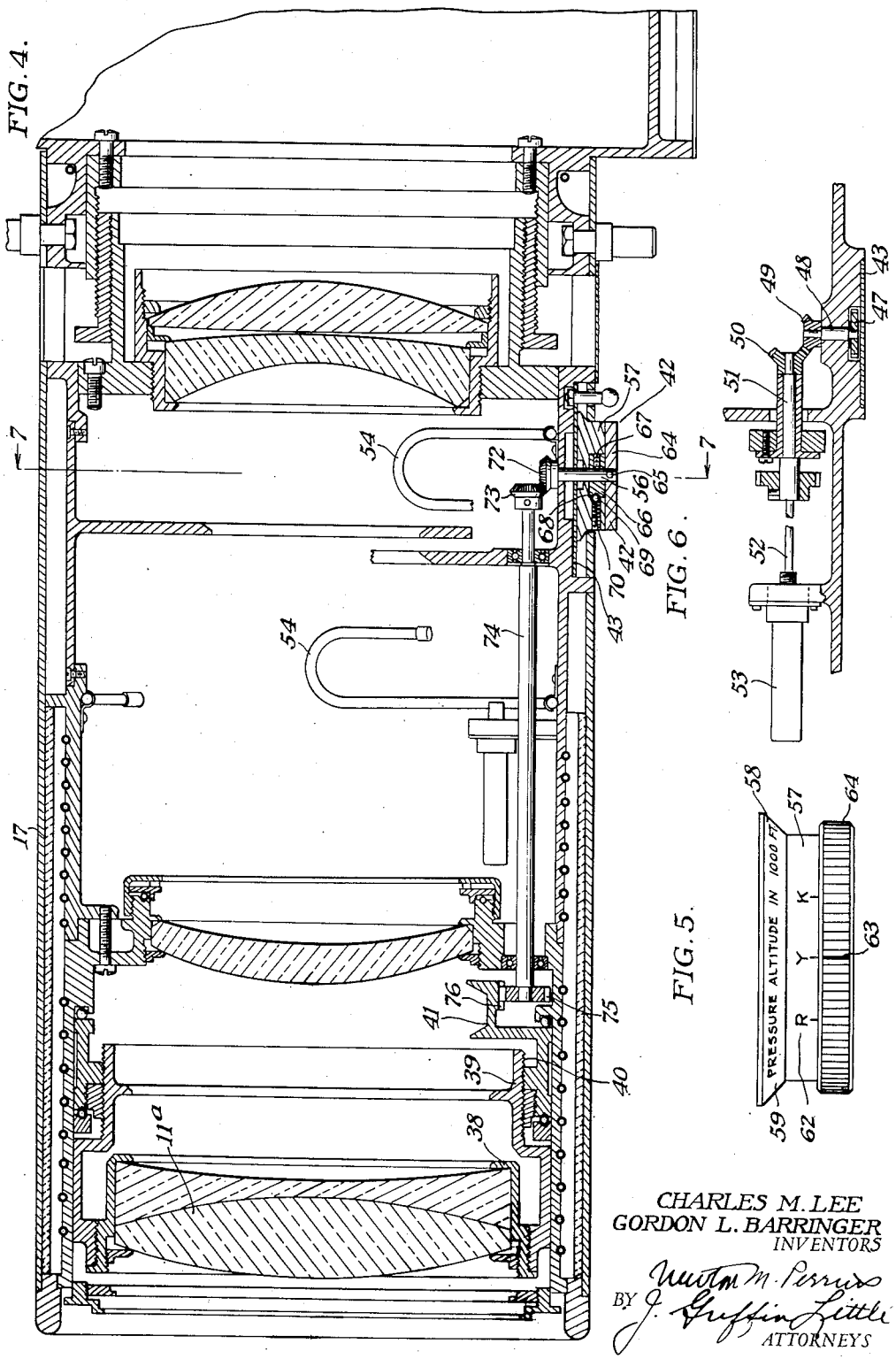
CHARLES M. LEE
GORDON L. BARRINGER
INVENTORS
BY
ATTORNEYS Nov. 13, 1951  C. M. LEE ET AL  2,575,020
FOCUS ADJUSTING MECHANISM FOR AERIAL CAMERAS
Filed Dec. 6, 1947  3 Sheets-Sheet 3

CHARLES M. LEE
GORDON L. BARRINGER
INVENTORS
BY
ATTORNEYS

Patented Nov. 13, 1951

2,575,020

UNITED STATES PATENT OFFICE 2,575,020

FOCUS ADJUSTING MECHANISM FOR AERIAL CAMERAS

Charles M. Lee and Gordon L. Barringer, Rochester, N. Y., assignors to Eastman Kodak Company, Rochester, N. Y., a corporation of New Jersey Application December 6, 1947, Serial No. 790,184

9 Claims. (Cl. 95—12.5)

The present invention relates to cameras, and more particularly to aerial cameras used for high altitude photography.

As with ordinary cameras, many aerial cameras are of the focusing type so that an adjustment must be made for altitude, or the distance between the camera and the object being photographed. In addition, if a filter is employed, certain compensations must be made therefor. However, in high altitude photography, unusual conditions are encountered which are not present when the camera is used on the ground. To obtain accurate results with long-focus aerial lenses, it is also necessary to compensate for the following effects.

1. Extremely low temperatures are encountered which tend to change the curvatures of the lenses thereby alternating their focal lengths.

2. The density of air becomes less thereby changing the index of refraction. This change of index changes the effectiveness of the inner air spaces of the lenses which are actually lenses in themselves.

In the lens system under discussion, heating elements are provided which are thermostatically controlled so as to maintain the lens system, and the adjacent camera parts, at a definite temperature or within a small temperature range. The camera body, adjacent the lens system, is insulated with a suitable insulating material to reduce heat losses, and thus assists in maintaining the temperature of the lens system. In order to obtain the various adjustments necessary, a compensating mechanism is provided by which the lens system may be preset or adjusted to compensate for the following conditions:

1. Altitude (actual altitude of plane).

2. Pressure altitude (pressure in the plane corresponding to an altitude in free air).

3. Temperature (the lens is set for ground temperatures and the thermostat maintains this temperature throughout the flight so that warping of the lenses will not occur).

4. Filter compensation. To compensate for the shifting focus of a lens with different colored light, an initial setting is provided depending upon the type of filter being used. This adjustment also compensates for any power which is present in the glass filter. In other words, each filter is previously calibrated and compensating setting provided on the computing mechanism.

The final object of all these compensations is to obtain as sharp a focus as possible. Under the conditions encountered in flight, each one of these effects contributes a certain known amount of shift to the focus of the lens system. The computing mechanism is so designed that it will compensate for these various factors. For convenience in operation, it has been found desirable to obtain the compensation in focus by an adjustment of the front lens element only. This compensation is secured by mounting the front element in a threaded sleeve which cooperates with a compensating mechanism. The final result of a computing scale is transmitted to the front lens element, in terms of rotation for which a corresponding axial movement is obtained, to adjust the axial position of the front lens element to compensate for the various factors.

In planes used for high altitude photography, cameras are usually positioned in a cabin which is pressurized for a definite altitude. For example, the plane cabin in which the camera is mounted may be under a pressure corresponding to an altitude of say 8000 feet in free air, while the plane itself may be at a much higher altitude. This cabin pressure is known as "pressure altitude," and the air in the cabin has an index of refraction corresponding to an altitude of 8000 feet in free air. Therefore, a correction must be made for this index or "pressure altitude." Thus, where the term "pressure altitude" is used in the specification and claims, it refers to the index of the air in the pressurized cabin. Obviously, this factor will vary with changes in the air pressure in the plane cabins, and may be of any suitable figure, as will be readily appreciated by those in the art.

The present invention has as its principal object a compensating mechanism by which the lens system may be adjusted to compensate for various factors which affect the final focal length of the lens system.

A still further object of the invention is the provision of a compensating mechanism which will accurately position the front lens element to maintain the lens system in focus for the conditions for which the mechanism is adjusted.

Yet another object of the invention is the provision of a compensating mechanism which is simple, rugged, and effective in use.

To these and other ends, the invention resides in certain improvements and combinations of parts, all as will be hereinafter more fully described, the novel features being pointed out in the claims at the end of the specification.

In the drawings:

Fig. 1 is a longitudinal sectional view through the lens system of an aerial camera, showing the adjustable front lens element, and a compensating means therefor constructed in accordance with the present invention;

Fig. 2 is a longitudinal sectional view taken through the front end of the lens mount illustrated in Fig. 1, but on a larger scale than the latter, showing the details of the mounting for the front lens element and the adjusting scales in the preferred arrangement of the compensating mechanism;

Fig. 3 is a partial view of the compensating scales positioned at the front end of the lens mount illustrated in Fig. 1.

Fig. 4 is a longitudinal sectional view through a lens mount of an aerial camera, showing the relation thereto of a modified form of compensating mechanism;

Fig. 5 is a view of a portion of the compensating mechanism dial, showing the arrangement for compensating for the filter being used;

Fig. 6 is a side elevation view, with parts in section, of a thermostat and the adjusting mechanism therefor;

Figure 7:
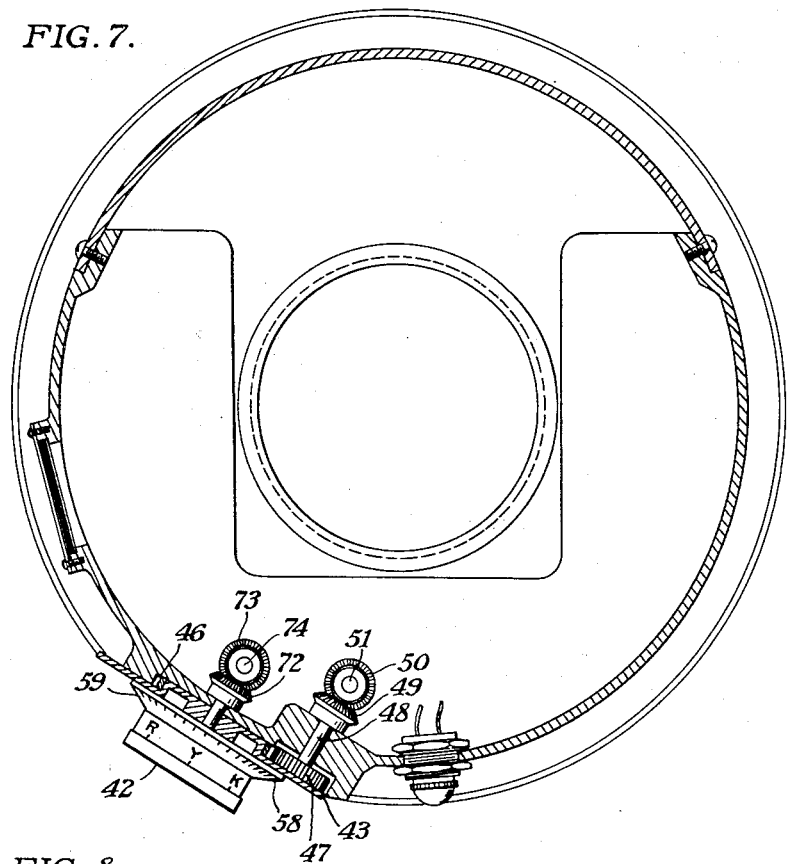
Fig. 7 is a transverse sectional view through the lens mount illustrated in Fig. 4 and taken substantially on line 7—7 thereof, showing a portion of the mechanism for transmitting the adjustment of the dial to the thermostat and the front lens element.

Fig. 1 shows a lens mount 10 of an aerial camera in which is positioned lens elements 11, 12, and 13, and a filter 14. As the temperature varies, the lens elements and filter change their curvatures to alter the focal length of the complete lens system. In order to maintain the axial positions of the lens elements, the latter are all mounted on and carried by peripherially spaced longitudinally extending I-beams formed of a material having a low coefficient for expansion, such, for example, as an alloy known by the name of "Invar." These I-beams thus retain the lens elements in their respective axial positions with changes in temperature. However, as the temperature varies, the curvatures of the lens elements themselves will vary, as is well known. In order to compensate for this, heating coils 15 are positioned within the lens mount and are connected in any suitable well known manner to a thermostat 16 which may be adjusted to maintain the desired temperature within the lens mount. As the thermostat and adjusting mechanism therefor do not constitute, per se, a part of the present invention, and may be of any suitable and well known construction, details thereof will not be shown. Heat insulation material 17 of any suitable composition is used to provide an insulating blanket or coating for the lens system to retain the heat within the lens mount.

In addition to temperature, the lens system must be adjusted to compensate for altitude, pressure altitude, and the filter being used. The necessary adjustment for these effects is secured by axially moving the front lens element 11. To this end, the element 11 is mounted in a cell 18 having an external thread 19 movable along a similar fixed thread on the camera mount, as shown in Fig. 1. Therefore, as the lens 18 is rotated it will move axially of the lens mount. This axial movement must, however, be in proper relation for the altitude, pressure altitude present, and filter factors being used.

To secure this compensation the front of the lens mount has mounted thereon a pair of aligned annular members or rings 20 and 21 loosely mounted on the outer surface 22 of the mount, as clearly illustrated in Figs. 1 and 2. The ring 20 carries a filter scale 23 and an altitude scale 24 arranged along opposite sides, while the ring 21 carries a pressure altitude scale 25 arranged in edge-to-edge relation with the altitude scale 24, all as best shown in Fig. 3. A plate 26 positioned inside the mount is provided with a bolt 27 which extends through an opening in the lens mount and a registering hole in scale 20 and has the end thereof threaded to receive a nut 28. The front lens element has secured thereto a bifurcated member 29 formed with an axially projecting part 30 to which is secured a lug 31 which projects through an opening in the mount and a registering aperture in the scale 21, and has the outer end thereof threaded to receive the nut 32. The rings 20 and 21 with the scales 23, 24, and 25 operate in a manner similar to a slide rule to add or sum up the effect of the filter, pressure altitude and altitude, and to transmit the summation of these effects to the front lens element to axially position the latter in accordance with the adjustments of the scales.

In making such adjustments, the nut 28 is first backed off to free ring 20 which is then rotated on the outer surface of the lens mount to bring the proper numeral of the filter scale 23 into register with the fixed index 33 formed on the lens mount. The numerals on the scale 23 relate to various types of filters which have been previously calibrated. After the ring 20 has been thus adjusted, the nut 28 is tightened to retain the ring 20 in locked position. Thereupon the nut 32 is loosened to free ring 21 which is then rotated to bring the proper reading on the pressure altitude scale 25 into registry with the correct reading of the altitude scale 24 to add the adjustment of the filter, altitude and pressure altitude to form a composite reading. Since the ring 21 is connected to the front lens element 11, adjustment of this ring serves to shift the element axially to position the latter in proper focus and to compensate for the altitude at which the plane is flying (actual altitude), the altitude corresponding to the pressure in the plane cabin (pressure altitude), and the filter being used. The adjustments may be made while the plane is in flight, but if the conditions of flight are known before take-off, the settings may be made prior to flight and while the plane is on the ground, as is apparent. Thus the front lens element is corrected for temperature, altitude, pressure altitude, and for the filter being used, the advantages of which will be readily apparent to those familiar with aerial cameras.

Figs. 4 to 7 show a modified form of compensating mechanism, parts corresponding to those in Figs. 1 to 3 are designated by the same numerals. In this modified embodiment, however, the temperature factor is also utilized in the adjustment of the front lens element 11a, which is mounted in the lens cell 38 which is non-rotatable but axially movable in the mount 10. The cell 38 has a rearwardly projecting sleeve 39 the outer surface of which is formed with a thread 40 adapted to engage a complementary thread of a rotatable but non-axially movable ring 41. It will be thus apparent, that when the ring 41 is rotated, the front lens element 11a will be shifted axially of the lens mount. In order that the movement of the element 11a will be in the proper direction in the mount, the ring 41 is connected by means to be later described, to a compensating mechanism generally indicated by the numeral 42, Fig. 4, and shown in more detail in Fig. 8.

The computing mechanism of this embodiment comprises in part, a flat annular member or disk 43 the outer edge of which carries a temperature scale 44 adapted to cooperate with a fixed index mark 45. The temperature reading is preferably made while the plane is on the ground and is adjusted for ground temperature, at which temperature the lens system is maintained throughout the flight. Obviously, other temperatures may be used provided the necessary adjustment of the other scales, to be later described, are made, but it has been found most desirable to adjust the lens system for ground temperature. The temperature control disk 43 carries a gear 46 which meshes with a gear 47 carried by one end of a shaft 48 the other end of which carries a bevel gear 49 meshing with a bevel gear 50 mounted on one end of a shaft 51 the other end of which has connected thereto a flexible shaft 52 which, in turn, is connected to a thermostat 53 connected into the circuit of the heating coil 15. As such electrical connections are well known, details thereof are not shown.

Figure 8:
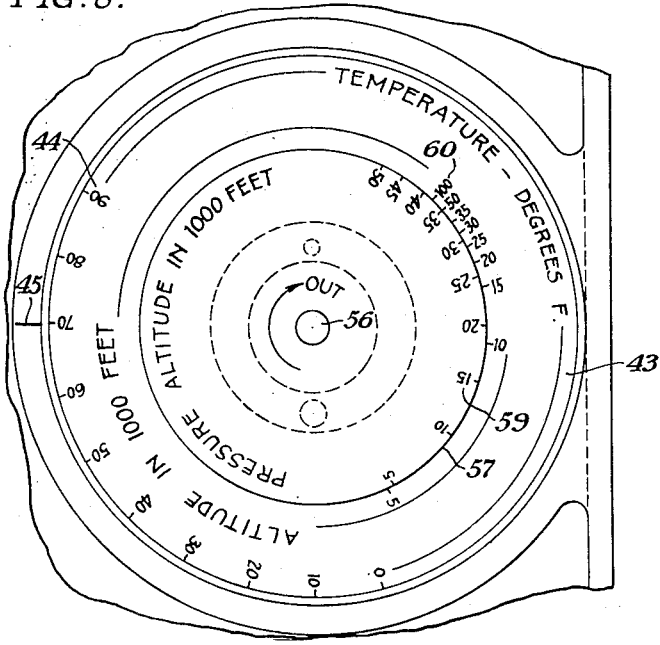
Fig. 8 is a view of the dial of the compensating mechanism, showing the relation of the various parts and the scales.

It will thus be apparent that upon rotation of the disk 43 to bring the proper reading on the scale 44 into register with the index mark 45, the thermostat 53 will be adjusted to a definite temperature which is maintained by the heating coil 15. Other heating coils 54 may be located at desired positions in the mount and are controlled by thermostat 53. The temperature control disk 43 is loosely mounted on a shaft 56 which also carries a knob 57 having a flared end 58 which overlies the temperature disk, as best shown in Fig. 8. The outer edge of the flared end 58 carries a pressure altitude scale 59 which is arranged in edge-to-edge relation with an altitude scale 60 formed on the disk 43, as best shown in Fig. 8. The lower cylindrical portion of the knob 57 also carries a filter scale 62 which is adapted to cooperate with an index mark 63 formed on a hand knob 64 fixed to shaft 56 by a pin 65 or other suitable fastening means, and as best shown in Fig. 4. The knob 57 is releasably connected to the shaft 56 by means of a "click stop" which comprises a collar 66 positioned within the knob 57 and secured to shaft 56 by a set screw 67. The collar 66 is formed with a plurality of peripherally arranged recesses 68 adapted to receive a ball 69 urged inwardly by a spring 70 mounted in a radial slot formed in the knob 57. The number and positions of the recesses used depends on the number and types of various filters used. The spring pressed ball 69 and recesses 68 provide a "click stop" by which the knob 57 may be releasably connected to shaft 56. The inner end of the latter, in turn, carries a bevel gear 72 which meshes with a bevel gear 73 carried by the rear end of a shaft 74 the front end of which carries a gear 75 meshing with a gear 76 carried by the ring 41. It will thus be apparent that when the shaft 56 is rotated, the front lens element 11a will be shifted axially.

The sequence of adjustments is as follows: The knob 57 is first rotated relative to shaft 56 to bring the proper filter reading on the scale 62 into registry with the mark 63 on knob 64.

When the proper reading is reached, the ball 69 will then register with and snap into one of the recesses 68 to connect the knob 57 releasably to the shaft 56. The "click stop" mechanism thus provides an arrangement by which the knob 57 may be connected in operative relation to the shaft 56, yet may permit the knob to be rotated relative to the shaft to adjust for the particular filter being used so as to add the filter compensation into the final result. The next step is to rotate disk 43 on and relative to the shaft 56 to bring the proper temperature reading on the scale 44 into register with the fixed index mark 45 to adjust the thermostat 53 and to add in the temperature factors. Such rotation of disk 43 also serves to rotate the altitude scale 60 which is also carried by disk 43. With these two adjustments made the knob 64 is then rotated to rotate the knob 57 as a unit therewith, by reason of the "click stop" mechanism, to bring the proper reading of the pressure altitude scale 59 into register with the selected portion of the altitude scale 60. In Fig. 8, the pressure altitude scale 59 is adjusted with the reading "5" into approximate alignment with the reading "5" of the altitude scale 60 which means that the mechanism is adjusted for a plane flight at 5000 feet with the pressure in the plane cabin adjusted to an altitude of approximately 5000 feet of free air. Obviously, other adjustments may be used to suit the particular altitude and pressure altitude conditions encountered. Also, the conditions of flight may be determined before the take-off and adjustment made while the plane is still on the ground, or the setting may be made while the plane is in flight.

When the knob 64 is rotated to position the knob 57 and the scale 59, the shaft 56 is simultaneously rotated. This rotation is transmitted through gears 72, 73, shaft 74 and gears 75 and 76 to rotate ring 41 which, through its threaded connection with the sleeve 39, shifts the front lens cell 38, and hence the lens element 11a axially to compensate for (1) the filter used, (2) temperature, (3) pressure altitude; and (4) altitude. Thus, the various factors for which the compensation must be made are added together and the sum total of the adjustments necessary is transmitted by shaft 74 to move the front lens element 11a the proper amount and direction so that the lens will be moved in accordance with all these factors.

The present invention thus provides an arrangement by which certain corrections found necessary for aerial cameras are made, and the sum of these corrections is established by the compensating mechanism and transmitted therefrom to the front lens element to properly position the latter axially to maintain the lens system in focus.

While certain embodiments of the invention have been disclosed, it is to be understood that the inventive idea may be carried out in a number of ways. This application, is therefore, not to be limited to the precise details described but it intended to cover all variations and modifications falling within the scope of the appended claims.

What we claim and desire to be secured by Letters Patent of the United States is:

1. In an aerial camera, the combination with a lens system having a front lens element which is axially adjustable for focusing, a dial having a scale thereon calibrated in terms of altitude, a second dial having a scale thereon calibrated in terms of pressure altitude, said dials being positioned with the scales thereon in edge to edge relation, said second dial being movable relative to said first dial to adjust said second scale relative to said first scale to add preselected readings on said scales, and means for connecting said second dial to said lens element to move the latter upon movement of said second dial to transmit the addition to said lens so as to adjust the latter to compensate both for altitude and pressure altitude.

2. In an aerial camera, the combination with a lens system having a front lens element which is axially adjustable for focusing, of a pair of concentrically arranged disks, one of said disks having a scale calibrated in terms of altitude and the other disk having a scale in edge to edge relation with said first scale and calibrated in terms of pressure altitude, said second disk being movable relative to said first disk to position said scales in a relation to add the effect of both scales, and means for connecting said second disk to said lens so that movement of said second disk is transmitted to said element to adjust the latter for altitude and pressure altitude.

3. In an aerial camera, the combination with a lens system having a front lens element which is axially movable for focusing, of a light filter positioned within said camera and on the axis of said system, a dial having a scale thereon calibrated in terms of altitude, a second dial positioned adjacent said first dial and having a scale thereon calibrated in terms of pressure altitude and arranged in edge to edge relation with said first scale, one of said dials also having a filter scale thereon which is movable relative to an index mark to adjust said one dial in accordance with the filter used, one of said dials being movable relative to the other dial to bring said first two scales into a relation to add the compensation required for altitude and pressure altitude to the compensation necessary for the filter, and means for connecting said movable dial to said element to adjust the latter for the total addition so that said lens element is positioned to compensate for the filter, altitude and pressure altitude.

4. In an aerial camera, the combination with a lens system having a front lens element, which is axially adjustable for focusing, of a light filter positioned within said camera and on the axis of said system, a pair of concentrically arranged disks, a fixed index mark, one of said disks having filter calibratings thereon adapted to be brought selectively into registry with said mark to adjust said one disk to compensate for the filter, said one disk also having a pressure altitude scale arranged in edge to edge relation with an altitude scale on the other disk, said one disk being movable relative to said other disks to adjust said edge to edge scales to add an adjustment for altitude and pressure altitude to the filter adjustment, and means for connecting said one disk to said element to adjust the latter for the filter, altitude and pressure altitude.

5. In an aerial camera, the combination with a lens system having a front lens element which is axially adjustable for focusing, of a ring mounted on said camera and having a scale calibrated in terms of altitude, a second ring mounted on said camera adjacent said first ring and provided with a scale calibrated in terms of pressure altitude and arranged in edge to edge relation with said first scale, said second ring being movable relative to said first ring to move said second scale relative to said first scale to add the adjustment necessary to compensate for altitude and pressure altitude, and means for connecting said second ring to said lens element to transmit the compensation thereto to shift said lens element axially to position the latter for altitude and pressure altitude.

6. In an aerial camera, the combination with a lens system having a front lens which is axially adjustable for focusing, of a ring mounted on said camera adjacent said element, a fixed index mark on said camera, said ring having a filter scale along one edge thereof adapted to be adjusted relative to said mark to compensate for the filter, said ring also having a scale along the other edge calibrated in terms of altitude, a second ring positioned on said camera in abutting relation with said first ring and having a pressure altitude scale arranged in edge to edge relation with said altitude scale, said second ring being movable relative to said first ring to position said pressure altitude scale relative to the altitude scale to combine the altitude and pressure altitude adjustment together with the filter adjustment, and means connecting said second ring to said lens element whereby the movement of said second ring will transmit said adjustments to said element to position the latter to compensate for the filter, altitude and pressure altitude.

7. In an aerial camera, the combination with a lens system having a front lens which is axially adjustable for focusing, of means for heating said camera and lens system, a thermostat for controlling said heating means, means including a rotatable disk for adjusting said thermostat for a definite temperature, a fixed index mark on said camera, a temperature scale on said disk adjustable relative to said mark to adjust said disk in accordance with the temperature, a scale on said disk calibrated in terms of altitude, a second disk concentric with said first disk and carrying a scale calibrated in terms of pressure altitude and adapted to cooperate with said altitude scale, a knob provided with an index mark, a filter scale carried by said second disk and posioned adjacent and adjustable relative to said index mark on said knob, said second disk being also movable relative to said first disk to move said altitude and pressure altitude scale relatively to add the adjustment of the altitude and pressure altitude to the filter adjustment, and means for connecting said second disk to said elements to adjust the latter in accordance with the filter, altitude and pressure altitude adjustments.

8. In an aerial camera, the combination with a lens system having a front lens element which is axially adjustable for focusing, of electric means for heating said camera and system, a thermostat for controlling the temperature of said heating means, a shaft, an annular rotatable disk loosely mounted on said shaft and operatively connected to said thermostat to adjust the latter, means for connecting said shaft to said element, a fixed index mark on said camera, a temperature scale carried by said disk movable relative to said mark to position a part of said scale in registry with said mark to indicate the adjustment of said thermostat, an altitude scale carried by said disk, a second disk positioned within said first disk and carrying a scale calibrated in terms of pressure altitude and arranged in edge to edge relation with altitude scale, said second disk being rotatable relative to said first disk to adjust said pressure altitude scale relative to said altitude scale, the adjustment of said second disk serving to add the temperature, altitude and pressure altitude factors, and means for operatively connecting said second disk to said shaft to adjust said shaft to move said element to compensate for temperature, altitude and pressure altitude.

9. In an aerial camera, the combination with a lens system having a front lens element which is axially adjustable for focusing, of electric means for heating said camera and lens system, a thermostat for regulating and controlling the temperature of said heating means, a shaft, an annular control disk loosely mounted on said shaft, means for connecting said disk to said thermostat, an index mark on said camera, a temperature scale carried by said disk and adapted to cooperate with said mark to indicate the adjustment of said thermostat, an altitude scale formed on said disk adjacent the inner edge thereof, a knob loosely mounted on said shaft and having a flange positioned adjacent the inner edge of said disk, a pressure altitude scale on said flange in edge to edge relation, an operating portion connected to said shaft, an index mark carried by said portion, a filter scale carried by said knob and adjustable relative to said second index mark to adjust said knob for the filter used, means releasably connecting said knob to said shaft to permit said last adjustment but to then operatively connect said knob to said shaft so that the latter may be rotated to adjust said pressure altitude scale relative to altitude scale to position said shaft to compensate for the filter, altitude and pressure altitude, means for connecting said shaft to said lens to shift the latter to compensate for the filter, pressure altitude and altitude.

CHARLES M. LEE.
GORDON L. BARRINGER.

REFERENCES CITED

The following references are of record in the file of this patent:

UNITED STATES PATENTS

| Number | Name | Date |
|---|---|---|
| 1,676,033 | Kinzler | July 3, 1928 |
| 1,819,476 | Owens | Aug. 18, 1931 |
| 2,247,323 | Tonnies | June 24, 1941 |
| 2,343,257 | Hineline | Mar. 7, 1944 |
| 2,470,455 | Avila | May 17, 1949 |